US010395106B2

(12) United States Patent
Yao et al.

(10) Patent No.: US 10,395,106 B2
(45) Date of Patent: Aug. 27, 2019

(54) HUMAN BODY POSTURE DATA ACQUISITION METHOD AND SYSTEM, AND DATA PROCESSING DEVICE

(71) Applicant: Wuhan Zhunwofei Science and Technology Co., LTD, Wuhan, Hubei (CN)

(72) Inventors: Yao Yao, Wuhan (CN); Su Wang, Shenzhen (CN)

(73) Assignee: Wuhan Zhunwofei Science and Technology Co., LTD, Hubei (CN)

( * ) Notice: Subject to any disclaimer, the term of this patent is extended or adjusted under 35 U.S.C. 154(b) by 174 days.

(21) Appl. No.: 15/598,741

(22) PCT Filed: Dec. 2, 2014

(86) PCT No.: PCT/CN2014/092757
§ 371 (c)(1),
(2) Date: May 18, 2017

(87) PCT Pub. No.: WO2016/078131
PCT Pub. Date: May 26, 2016

(65) Prior Publication Data
US 2019/0147237 A1 May 16, 2019

(30) Foreign Application Priority Data
Nov. 20, 2014 (CN) .......................... 2014 1 0669423

(51) Int. Cl.
| G06F 3/01 | (2006.01) |
| G06K 9/00 | (2006.01) |
| G06T 19/00 | (2011.01) |

(52) U.S. Cl.
CPC ......... *G06K 9/00382* (2013.01); *G06F 3/012* (2013.01); *G06K 9/00369* (2013.01); *G06T 19/006* (2013.01)

(58) Field of Classification Search
CPC ... G06F 3/012; G06T 19/006; G06K 9/00369; G06K 9/00382
See application file for complete search history.

(56) References Cited

U.S. PATENT DOCUMENTS

| 6,009,210 A * | 12/1999 | Kang ................. G06K 9/00228 345/156 |
| 7,324,664 B1 * | 1/2008 | Jouppi ............... G06K 9/00255 348/169 |

(Continued)

FOREIGN PATENT DOCUMENTS

| CN | 101996311 | 3/2011 |
| CN | 101996311 A | 3/2011 |

(Continued)

OTHER PUBLICATIONS

Horprasert et al. "Computing 3-d head orientation from a monocular image sequence." Proceedings of the second international conference on automatic face and gesture recognition. IEEE, 1996. (Year: 1996).*

(Continued)

*Primary Examiner* — Katrina R Fujita
(74) *Attorney, Agent, or Firm* — Bachmann Law Group PC

(57) ABSTRACT

Provided are a human body posture data acquisition method and system, and a data processing device. The method comprises: obtaining feature data between pre-calibrated human body feature points; obtaining a rotational angle of the human body feature points; and obtaining human body posture data according to the rotational angle of the human body feature points and the feature data between the human body feature points. In the method, head rotation data is obtained by directly providing a head wearing device on the head. Accordingly, body rotation data is obtained by providing a body wearing device on the human chest, and then (Continued)

human body posture data is obtained via the head rotation data and the body rotation data, thereby alleviating the problem that an error in sensed data is caused with the existing human body posture identification methods due to a poor mobility, sensitivity to environmental impacts and susceptibility to disturbances.

10 Claims, 3 Drawing Sheets

(56) References Cited

U.S. PATENT DOCUMENTS

| | | | | |
|---|---|---|---|---|
| 7,862,172 | B2* | 1/2011 | Yoshinaga | A61B 3/113 351/209 |
| 7,868,610 | B2* | 1/2011 | Velinsky | G01C 17/30 324/207.25 |
| 9,244,529 | B2* | 1/2016 | Model | G06F 3/013 |
| 2002/0019258 | A1 | 2/2002 | Kim et al. | |
| 2012/0147328 | A1* | 6/2012 | Yahav | A61B 3/113 351/210 |
| 2013/0083976 | A1* | 4/2013 | Ragland | G06F 3/011 382/117 |

FOREIGN PATENT DOCUMENTS

| | | |
|---|---|---|
| CN | 103150752 | 7/2013 |
| CN | 103631381 | 3/2014 |

OTHER PUBLICATIONS

Ji, Qiang. "3D face pose estimation and tracking from a monocular camera." Image and vision computing 20.7 (2002): 499-511. (Year: 2002).*

Keir et al. "A new approach to accelerometer-based head tracking for augmented reality & other applications." 2007 IEEE International Conference on Automation Science and Engineering. IEEE, 2007. (Year: 2007).*

Pathangay et al. "Symmetry-based face pose estimation from a single uncalibrated view." 2008 8th IEEE International Conference on Automatic Face & Gesture Recognition. IEEE, 2008. (Year: 2008).*

PCT International Search Report, PCT/CN2014/092757, dated May 26, 2016, pp. 1-2.

* cited by examiner

HUMAN BODY POSTURE DATA ACQUISITION METHOD AND SYSTEM, AND DATA PROCESSING DEVICE

CROSS REFERENCE TO RELATED APPLICATIONS

The present application is a national phase application under 35 USC 371 and claims priority benefit to PCT application number PCT/CN2014/092757, having an international filing date of Dec. 2, 2014, the disclosure of which is incorporated herein in its entirety

TECHNICAL FIELD

The present invention relates to the field of body feeling identification, and particularly to a human body posture data acquisition method and system, and a data processing device.

BACKGROUND ART

In the technical field of human-computer interaction, with the development of interactive games, virtual reality and head-mounted display technologies, operations that are performable in free movement without usage of hands will be applied more widely. Therefore, identification of a human body posture is the most convenient, flexible, accurate and reliable human-computer interaction method, except for that achieved with a keyboard, a mouse and a touch screen. Existing human body posture identification methods are mainly implemented by using a third-party sensing device to sense a motion of the head at a certain distance. However, due to a limited detection range of the sensing device, the existing human body posture identification methods do not have a good mobility; moreover, the sensing device is sensitive to environmental impacts and susceptible to disturbances, thus causing an error in sensed data.

DISCLOSURE OF THE INVENTION

The present invention aims to provide a human body posture data acquisition method and system, and a data processing device, to alleviate the problem that an error in sensed data is caused with the existing human body posture identification methods due to a poor mobility, sensitivity to environmental impacts and susceptibility to disturbances.

The present invention is realized as follows:

In a first aspect, an embodiment of present invention provide a human body posture data acquisition method, applicable to a human body posture data acquisition system, where the human body posture data acquisition system includes a data processing device, and the human body posture data acquisition method includes:

the data processing device obtaining feature data between pre-calibrated human body feature points, where the pre-calibrated human body feature points include a human head center point, a head rotation center point and a body rotation center point, and the feature data includes a length of a first line segment between the head center point and the head rotation center point, and a length of a second line segment between the head rotation center point and the body rotation center point;

obtaining rotational angles of the human body feature points, where the rotational angles include a first rotational angle of the first line segment relative to a vertical direction with the first line segment between the head center point and the head rotation center point, and a second rotational angle of the second line segment relative to the vertical direction with the second line segment between the head rotation center point and the body rotation center point, the first rotational angle and the second rotational angle being located on a same plane; and obtaining human body posture data according to the rotational angles of the human body feature points and the feature data between the human body feature points, where the human body posture data includes the rotational angles of the human body feature points, a first horizontal displacement of the head center point relative to the head rotation center point, and a second horizontal displacement of the head rotation center point relative to the body rotation center point, the first horizontal displacement being obtained by multiplying the length of the first line segment by a sinusoidal function value of the first rotational angle, and the second horizontal displacement being obtained by multiplying the length of the second line segment by a sinusoidal function value of the second rotational angle.

In connection with the first aspect, an embodiment of the present invention provides a first possible implementation of the first aspect, specifically, the human body posture data further includes: a third horizontal displacement of the head center point relative to the body rotation center point, the third horizontal displacement being obtained by adding the first horizontal displacement and the second horizontal displacement together.

In connection with the first aspect, an embodiment of the present invention provides a second possible implementation of the first aspect, specifically, the human body posture data acquisition system includes a first three-axis gyroscope, a first three-axis accelerometer and a first three-axis magnetometer, and the step of obtaining the rotational angle of the pre-calibrated human body feature points, which includes the first rotational angle of the first line segment between the head center point and the head rotation center point relative to the vertical direction, includes:

the data processing device receiving the first rotational angle of the first line segment between the head center point and the head rotation center point relative to the vertical direction that is collected by the first three-axis gyroscope, a vertical directing reference obtained by the first three-axis accelerometer and a horizontal directing reference obtained by the first three-axis magnetometer.

In connection with the second possible implementation of the first aspect, an embodiment of the present invention provides a third possible implementation of the first aspect, specifically, the human body posture data acquisition system includes a second three-axis gyroscope, a second three-axis accelerometer and a second three-axis magnetometer, and the step of obtaining the rotational angle of the pre-calibrated human body feature points, which includes the second rotational angle of the second line segment between the head rotation center point and the body rotation center point relative to the vertical direction, includes:

the data processing device receiving the second rotational angle of the second line segment between the head rotation center point and the body rotation center point relative to the vertical direction that is collected by the second three-axis gyroscope, a vertical directing reference obtained by the second three-axis accelerometer and a horizontal directing reference obtained by the second three-axis magnetometer.

In a second aspect, an embodiment of the present invention provides a data processing device applicable to a human body posture data acquisition system. The data processing device includes:

a feature point data obtaining unit, configured to cause the data processing device to obtain feature data between pre-calibrated human body feature points, where the pre-calibrated human body feature points include a human head center point, a head rotation center point and a body rotation center point, and the feature data includes a length of a first line segment between the head center point and the head rotation center point, and a length of a second line segment between the head rotation center point and the body rotation center point;

a head rotational angle obtaining unit, configured to obtain a first rotational angle of the first line segment between the head center point and the head rotation center point relative to a vertical direction;

a body rotational angle obtaining unit, configured to obtain a second rotational angle of the second line segment between the head rotation center point and the body rotation center point relative to the vertical direction, the first rotational angle and the second rotational angle being located on a same plane;

a first displacement calculating unit, configured to multiply the length of the first line segment by a sinusoidal function value of the first rotational angle, to obtain a first horizontal displacement of the head center point relative to the head rotation center point; and a second displacement calculating unit, configured to multiply the length of the second line segment by a sinusoidal function value of the second rotational angle, to obtain a second horizontal displacement of the head rotation center point relative to the body rotation center point.

In connection with the second aspect, an embodiment of the present invention provides a first possible implementation of the second aspect, specifically, the data processing device further includes:

a third displacement calculating unit, configured to add the first horizontal displacement and the second horizontal displacement together, to obtain a third horizontal displacement of the head center point relative to the body rotation center point.

In the data processing device provided by the embodiments of the present invention, by means of the first three-axis accelerometer for obtaining the vertical directing reference, the first three-axis gyroscope for collecting the first rotational angle of the first line segment between the head center point and the head rotation center point relative to the vertical direction, and the first three-axis magnetometer for obtaining the horizontal directing reference that are provided in a head wearing device, the data processing device obtains accurate head rotation data. Correspondingly, a body wearing device is provided therein with the second three-axis accelerometer for obtaining the vertical directing reference, the second three-axis gyroscope for collecting the second rotational angle of the second line segment between the head rotation center point and the body rotation center point relative to the vertical direction, and the second three-axis magnetometer for obtaining the horizontal directing reference, body rotation data is obtained. And then, human body posture data is obtained with the head rotation data and the body rotation data. In this way, it alleviates the problem that an error in sensed data is caused with the existing human body posture identification methods due to a poor mobility, sensitivity to environmental impacts and susceptibility to disturbances.

In a third aspect, a human body posture data acquisition system includes a data processing device configured to obtain feature data between pre-calibrated human body feature points, where the pre-calibrated human body feature points include a human head center point, a head rotation center point and a body rotation center point, and the acquisition system further includes a head wearing device and a body wearing device.

The head wearing device is configured to be arranged on a human head, and collect a first rotational angle of a first line segment between the head center point and the head rotation center point relative to a vertical direction.

The body wearing device is configured to be arranged on a human chest, and collect a second rotational angle of a second line segment between the head rotation center point and the body rotation center point relative to the vertical direction.

The data processing device is configured to obtaining a length of the first line segment between the head center point and the head rotation center point, and a length of the second line segment between the head rotation center point and the body rotation center point.

The data processing device is further configured to obtain the first rotational angle of the first line segment between the head center point and the head rotation center point relative to the vertical direction, and the second rotational angle of the second line segment between the head rotation center point and the body rotation center point relative to the vertical direction.

The data processing device obtains human body posture data according to the length of the first line segment, the length of the second line segment, the first rotational angle and the second rotational angle. The human body posture data includes a first horizontal displacement of the head center point relative to the head rotation center point, and a second horizontal displacement of the head rotation center point relative to the body rotation center point. The first horizontal displacement is obtained by multiplying the length of the first line segment by a sinusoidal function value of the first rotational angle, and the second horizontal displacement is obtained by multiplying the length of the second line segment by a sinusoidal function value of the second rotational angle.

The head wearing device includes a head rotation data collecting unit, a first wireless data communication unit and a microprocessor, and the head rotation data collecting unit and the first wireless data communication unit each are electrically connected with the microprocessor.

The head rotation data collecting unit includes: a first three-axis accelerometer configured to obtain a vertical directing reference; a first three-axis gyroscope configured to collect the first rotational angle of the first line segment between the head center point and the head rotation center point relative to the vertical direction; and a first three-axis magnetometer configured to obtain a horizontal directing reference. The first three-axis accelerometer, the first three-axis gyroscope and the first three-axis magnetometer each are electrically connected with the microprocessor.

In connection with the third aspect, an embodiment of the present invention provides a first possible implementation of the third aspect, specifically, the body wearing device includes a body rotation data collecting unit and a second wireless data communication unit, and the body rotation data collecting unit is electrically connected with the second wireless data communication unit.

The body rotation data collecting unit includes: a second three-axis accelerometer configured to obtain a vertical directing reference; a second three-axis gyroscope configured to collect the second rotational angle of the second line segment between the head rotation center point and the body rotation center point relative to the vertical direction; and a second three-axis magnetometer configured to obtain a horizontal directing reference. The second three-axis accelerometer, the second three-axis gyroscope and the second three-axis magnetometer each are electrically connected with the second wireless data communication unit.

In connection with the third aspect, an embodiment of the present invention provides a second possible implementation of the third aspect, specifically, the head rotation data collecting unit further includes a temperature collecting unit configured to collect a temperature at a human head.

The Technical Effects Achieved by the Present Invention

With the human body posture data acquisition method provided by embodiments of the present invention, a head wearing device is directly arranged on the head, and the head wearing device is arranged therein with the first three-axis accelerometer for obtaining the vertical directing reference, the first three-axis gyroscope for collecting the first rotational angle of the first line segment between the head center point and the head rotation center point relative to the vertical direction, and the first three-axis magnetometer for obtaining the horizontal directing reference, so as to obtain accurate head rotation data. Correspondingly, a body wearing device is arranged on the human chest, and the body wearing device is arranged therein with the second three-axis accelerometer for obtaining the vertical directing reference, the second three-axis gyroscope for collecting the second rotational angle of the second line segment between the head rotation center point and the body rotation center point relative to the vertical direction, and the second three-axis magnetometer for obtaining the horizontal directing reference, so as to obtain body rotation data. And then, human body posture data is obtained with the head rotation data and the body rotation data. In this way, it alleviates the problem that an error in sensed data is caused with the existing human body posture identification methods due to a poor mobility, sensitivity to environmental impacts and susceptibility to disturbances.

BRIEF DESCRIPTION OF DRAWINGS

In order to more clearly illustrate technical solutions of embodiments of the present invention, drawings required for the embodiments will be descried briefly hereinafter. It should be understood that the following drawings illustrate only some of the embodiments of the present invention and shall not be regarded as limiting the scope. For a person of ordinary skilled in the art, other related drawings may also be obtained from these drawings without any inventive effort.

DETAILED DESCRIPTION OF EMBODIMENTS

Figure 1:
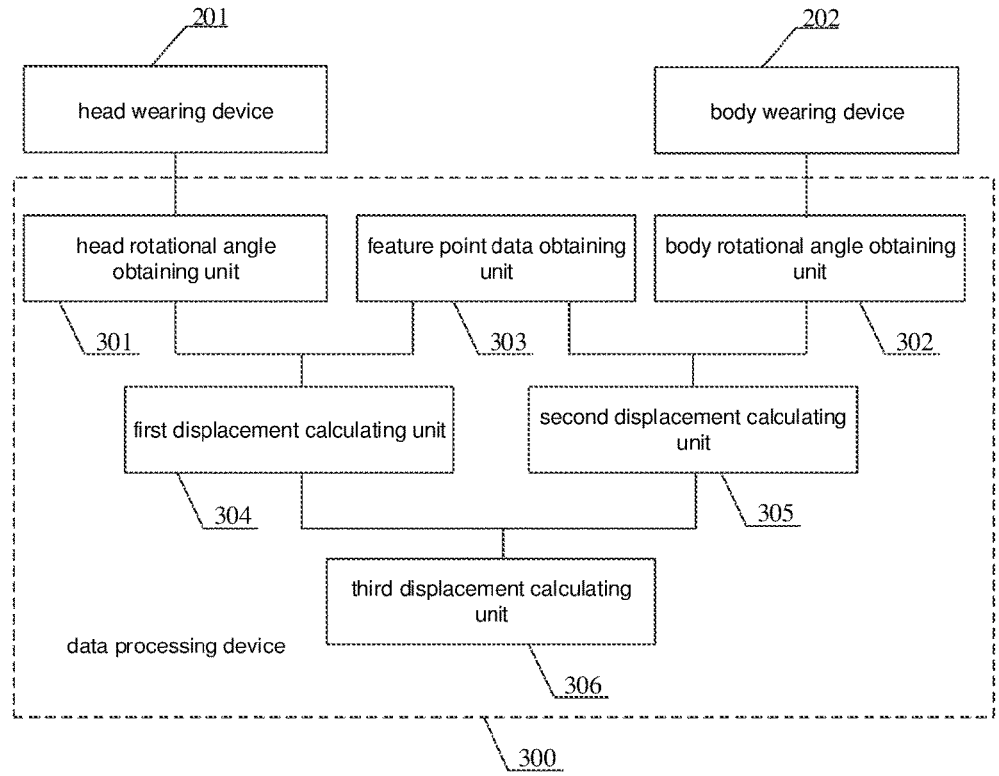
FIG. 1 is a structural block diagram of a human body posture data acquisition system provided by an embodiment of the present invention.

The technical solutions of the embodiments of the present invention will be clearly and completely described below in conjunction with the drawings of the embodiments of the present invention. Obviously, the described embodiments are only some but not all of the embodiments of the present invention. Generally, the components of the embodiments of the present invention, as described and illustrated in the drawings herein, may be arranged and designed in various configurations. Thus, the following detailed description of the embodiments of the present invention provided in the drawings is not intended to limit the scope of protection of the present invention, but only represents the selected embodiments of the present invention. Any other embodiments, obtained by a person skilled in the art on the basis of the embodiments of the present invention without creative efforts, shall fall within the scope of protection of the present invention.

In the technical field of human-computer interaction, with the development of interactive games, virtual reality and head-mounted display technologies, operations that are performable in free movement without usage of hands will be applied more widely. Therefore, identification of a human body posture is the most convenient, flexible, accurate and reliable human-computer interaction method, except for that achieved with a keyboard, a mouse and a touch screen. Existing human body posture identification methods are mainly implemented by using a third-party sensing device to sense a motion of the head at a certain distance. However, the existing human body posture identification methods would cause an error in sensed data due to a poor mobility, sensitivity to environmental impacts and susceptibility to disturbances. In view of this, after continuous research, the inventor proposes a human body posture data acquisition method and system, and a data processing device as provided by the embodiments of the present invention.

Figure 2:
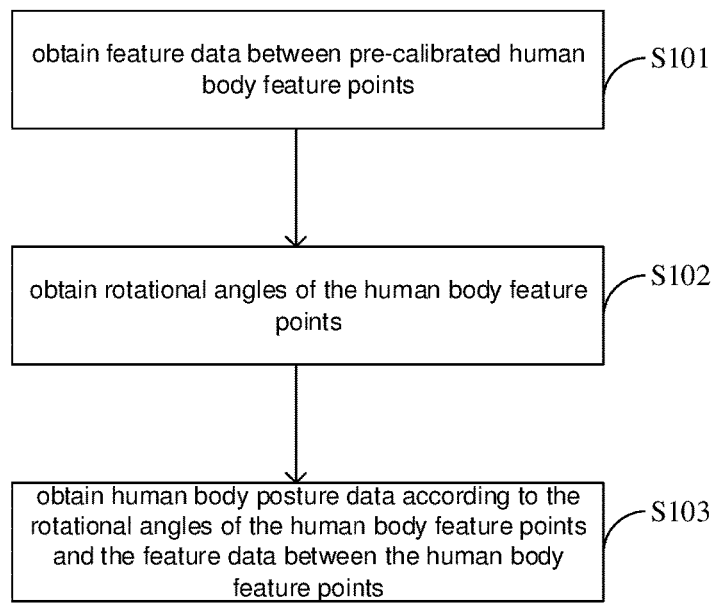
FIG. 2 is a flow chart of a human body posture data acquisition method provided by an embodiment of the present invention.
Figure 3:
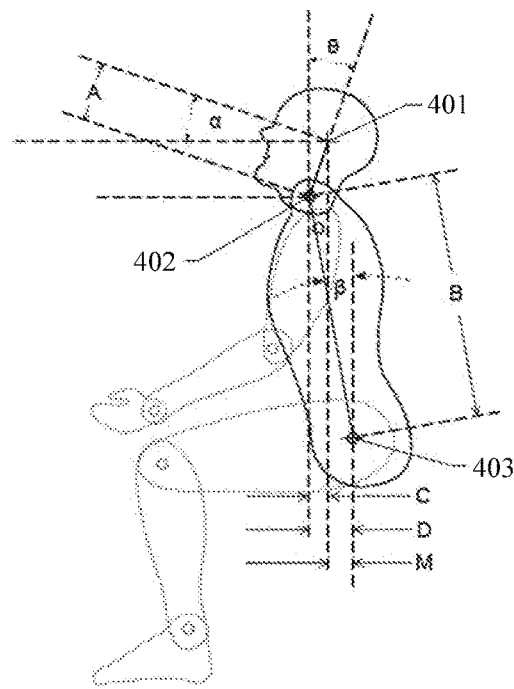
FIG. 3 is a schematic diagram showing calculation of a first horizontal displacement, a second horizontal displacement and a third horizontal displacement in the human body posture data acquisition method provided by an embodiment of the present invention.

Refer to FIGS. 1-4, a human body posture data acquisition system provided by an embodiment of the present invention is shown, where the system includes a data processing device 300 configured to obtain feature data between pre-calibrated human body feature points. As shown in FIG. 3, the pre-calibrated human body feature points include a human head center point 401, a head rotation center point 402 and a body rotation center point 403; and the feature data includes a length of a first line segment between the head center point 401 and the head rotation center point 402, i.e., the length of line segment A as shown in FIG. 3, and a length of a second line segment between the head rotation center point and the body rotation center point, i.e., the length of line segment B as shown in FIG. 3.

In practice, the human head center point 401 is a geometric center of the head and is located at the exact center of the human head. The head rotation center point 402 is a geometric center point of three-axis rotations, including vertical up-and-down rotation, horizontal left-and-right rotation and left-and-right inclination, of the human head, and it is located in the neck. The body rotation center point 403 is a geometric center point of three-axis rotations, including forward-and-backward bending, horizontal rotation and left-and-right inclination, of the body when a person is in a standing posture or a sitting posture, and it is located in the buttock.

In order to facilitate data collection, the acquisition system further includes a head wearing device 201 and a body wearing device 202. The head wearing device 201 is configured to be arranged on the human head, and collect a first rotational angle of the first line segment between the head center point 401 and the head rotation center point 402 relative to a vertical direction, i.e., angle θ as shown in FIG. 3.

The head wearing device 201 includes a head rotation data collecting unit, a first wireless data communication unit and a microprocessor. The head rotation data collecting unit and the first wireless data communication unit each are electrically connected with the microprocessor. The head rotation data collecting unit includes: a first three-axis accelerometer configured to obtain a vertical directing reference; a first three-axis gyroscope configured to collect the first rotational angle of the first line segment between the head center point and the head rotation center point relative to the vertical direction; and a first three-axis magnetometer configured to obtain a horizontal directing reference. The first three-axis accelerometer, the first three-axis gyroscope and the first three-axis magnetometer each are electrically connected with the microprocessor.

The body wearing device 202 is configured to be arranged on the human chest, and collect a second rotational angle of the second line segment between the head rotation center point 402 and the body rotation center point 403 relative to the vertical direction, i.e., angle β as shown in FIG. 3.

The body wearing device 202 includes a body rotation data collecting unit and a second wireless data communication unit. The body rotation data collecting unit is electrically connected with the second wireless data communication unit. The body rotation data collecting unit includes: a second three-axis accelerometer configured to obtain a vertical directing reference; a second three-axis gyroscope configured to collect the second rotational angle of the second line segment between the head rotation center point and the body rotation center point relative to the vertical direction; and a second three-axis magnetometer configured to obtain a horizontal directing reference. The second three-axis accelerometer, the second three-axis gyroscope and the second three-axis magnetometer each are respectively electrically connected with the second wireless data communication unit.

It should be noted that, in practice, data is transmitted between the head wearing device 201 and the body wearing device 202 through the first wireless data communication unit and the second wireless data communication unit. That is, after the component in the body wearing device 202 collects data about the second rotational angle of the second line segment between the head rotation center point 402 and the body rotation center point 403 relative to the vertical direction, this data is transmitted to the first wireless data communication unit through the second wireless data communication unit, so as to facilitate centralized processing, by the data processing device 300, on the body rotation data and the head rotation data. There are various modes to carry out the communication between the first wireless data communication unit and the second wireless data communication unit, for example, bluetooth, WiFi and Zigbee. The specific communication mode may be determined according to actual situations. After the data processing device 300 processes the data, the processed data may be transmitted to an external receiving device through the first wireless data communication unit.

It should be noted that, it is preferable to perform wireless communication between the head wearing device 201 and the body wearing device 202. In addition to the communication modes mentioned above, such data transmission may also be performed in a wired way.

The data processing device 300 is configured to: obtain the length of the first line segment between the head center point 401 and the head rotation center point 402, and the length of the second line segment between the head rotation center point 402 and the body rotation center point 403; and obtain the first rotational angle of the first line segment between the head center point 401 and the head rotation center point 402 relative to the vertical direction, and the second rotational angle of the second line segment between the head rotation center point 402 and the body rotation center point 403 relative to the vertical direction.

The human body posture data is obtained according to the length of the first line segment, the length of the second line segment, the first rotational angle and the second rotational angle. The human body posture data includes: the rotational angle at the head rotation center point 402, i.e., angle θ as shown in FIG. 3; the rotational angle at the body rotation center point 403, i.e., angle β as shown in FIG. 3; a first horizontal displacement of the head center point 401 relative to the head rotation center point 402, i.e., segment C as shown in FIG. 3; and a second horizontal displacement of the head rotation center point 402 relative to the body rotation center point 403, i.e., segment D as shown in FIG. 3. The first horizontal displacement is obtained by multiplying the length of the first line segment by a sinusoidal function value of the first rotational angle, and the second horizontal displacement is obtained by multiplying the length of the second line segment by a sinusoidal function value of the second rotational angle. For brevity purposes, the specific calculation step will be described in detail in the following acquisition method, and will not be described in detail herein.

In practice, an electronic device usually generates heat due to long-time operation, and the head wearing device in the system of the present invention is in direct contact with the head. Thus, in order to monitor the temperature state of the head wearing device during its operation in real time, it is preferable that the head rotation data collecting unit further includes a temperature collecting unit configured to collecting an internal of the head wearing device worn on the human body, so as to avoid adverse impacts on the body due to too high temperature of the device.

As shown in FIG. 2, a human body posture data acquisition method provided by an embodiment of the present invention is shown, which is applicable to the human body posture data acquisition system. The human body posture data acquisition method includes steps as follows:

In S101, the data processing device obtains feature data between the pre-calibrated human body feature points.

The pre-calibrated human body feature points include a human head center point 401, a head rotation center point 402 and a body rotation center point 403. The feature data includes a length of a first line segment between the head center point 401 and the head rotation center point 402, and a length of a second line segment between the head rotation center point 402 and the body rotation center point 403.

In practice, as a preferred selection, the length of the first line segment and the length of the second line segment need to be determined according to the actual body size of a user. Of course, it is also feasible to adopt an average value of the measured lengths of the first line segments between the head center point and the head rotation center point of a plurality of users, and an average value of the measured lengths of the second line segments between the head rotation center point and the body rotation center point of the plurality of users. In practice, after the length of the first line segment and the length of the second line segment are collected, the length values of the first line segment and the second line segment may be transmitted to the data processing device through an intelligent operating terminal or a computer in wireless or wired communication with the data processing device.

In S102, rotational angles of the human body feature points are obtained. As shown in FIG. 3, the rotational angles include a first rotational angle of the first line segment between the head center point 401 and the head rotation center point 402 relative to the vertical direction, and a second rotational angle of the second line segment between the head rotation center point 402 and the body rotation center point 403 relative to the vertical direction, the first rotational angle and the second rotational angle being located on a same plane.

However, in the implementation process, in order to more effectively measure the rotational angle, the human body posture data acquisition system includes a head wearing device 201, the head wearing device 201 includes a first three-axis gyroscope, a first three-axis accelerometer and a first three-axis magnetometer. The first three-axis accelerometer is configured to obtain a vertical directing reference, the first three-axis magnetometer is configured to obtain a horizontal directing reference, and the first three-axis gyroscope is configured to measure the first rotational angle of the first line segment between the head center point and the head rotation center point relative to the vertical directing reference obtained by the first three-axis accelerometer.

Correspondingly, the human body posture data acquisition system further includes a body wearing device 202, and the body wearing device 202 includes a second three-axis gyroscope, a second three-axis accelerometer and a second three-axis magnetometer. The second three-axis accelerometer is configured to obtaining a vertical directing reference, the second three-axis magnetometer is configured to obtain a horizontal directing reference, and the second three-axis gyroscope is configured to measure the second rotational angle of the second line segment between the head rotation center point and the body rotation center point relative to the vertical directing reference obtained by the second three-axis accelerometer.

In S103, human body posture data is obtained according to the rotational angles of the human body feature points and the feature data between the human body feature points. The human body posture data includes rotational angles at the head rotation center point 402 and the body rotation center point 403, a first horizontal displacement of the head center point 401 relative to the head rotation center point 402, and a second horizontal displacement of the head rotation center point 402 relative to the body rotation center point 403.

After the first line segment, the second line segment, the first rotational angle and the second rotational angle are obtained, the first horizontal displacement is obtained by multiplying the length of the first line segment by a sinusoidal function value of the first rotational angle, and the second horizontal displacement is obtained by multiplying the length of the second line segment by a sinusoidal function value of the second rotational angle.

That is, as shown in FIG. 3, the first line segment is line segment A, the second line segment is line segment B, the first rotational angle is $\theta$, and the second rotational angle is $\beta$. If the head is raised, $\theta$ is a negative value, and if the head is lowered, $\theta$ is a positive value. If the body leans forward, $\beta$ is a positive value, and is the body leans backward, $\beta$ is a negative value. During the implementation process, the first horizontal displacement, i.e., line segment C, which is in a first right-angled triangle containing an acute angle $\theta$, may be obtained according to a trigonometric function, specifically, it may be C=A*sin $\theta$ as line segment A is the hypotenuse of the first right-angled triangle. Correspondingly, the second horizontal displacement D, i.e., line segment D, which is in a second right-angled triangle containing an acute angle $\beta$, may be obtained according to a trigonometric function, specifically, it may be D=B*sin $\beta$ as line segment B is the hypotenuse of the second right-angled triangle.

Of course, in order to obtain more comprehensive human body posture data, after the first horizontal displacement and the second horizontal displacement are obtained, it is preferable to obtain a third horizontal displacement of the head center point relative to the body rotation center point, i.e., line segment M, by adding the first horizontal displacement and the second horizontal displacement together.

In order to further describe the calculation process in more detail, the following example is given. Assuming that the length between the head center point 401 and the head rotation center point 402 is measured as 15 cm, the length between the head rotation center point 402 and the body rotation center point 403 is measured as 60 cm, the body leans forward by 10 degrees, and the head is raised by 20 degrees, in this case, the distance value of the front-to-back displacement of the head center point relative to the body rotation center point in the horizontal direction is obtained with an accuracy to three decimal places:

$$60*(\sin 10°)+15*(-\sin 15°)=10.419-5.130=5.289 \text{ cm}.$$

With the human body posture data acquisition method provided by the embodiment of the present invention, the head wearing device 201 is directly arranged on the head, and the head wearing device 201 is arranged therein with the first three-axis accelerometer for obtaining the vertical directing reference, the first three-axis gyroscope for collecting the first rotational angle of the first line segment between the head center point and the head rotation center point relative to the vertical direction, and the first three-axis magnetometer for obtaining the horizontal directing reference, so as to obtain accurate head rotation data. Correspondingly, the body wearing device 202 is arranged on the human chest, and the body wearing device 202 is arranged therein with the second three-axis accelerometer for obtaining the vertical directing reference, the second three-axis gyroscope for collecting the second rotational angle of the second line segment between the head rotation center point and the body rotation center point relative to the vertical direction, and the second three-axis magnetometer for obtaining the horizontal directing reference, so as to obtain body rotation data. And then, human body posture data is obtained with the head rotation data and the body rotation data. In this way, it alleviates the problem that an error in sensed data is caused with the existing human body posture identification methods due to a poor mobility, sensitivity to environmental impacts and susceptibility to disturbances of the sensing device. Moreover, it improves the accuracy of the acquired human body posture data, thereby providing accurate data support for the realization of interactive games and virtual reality.

Figure 4:
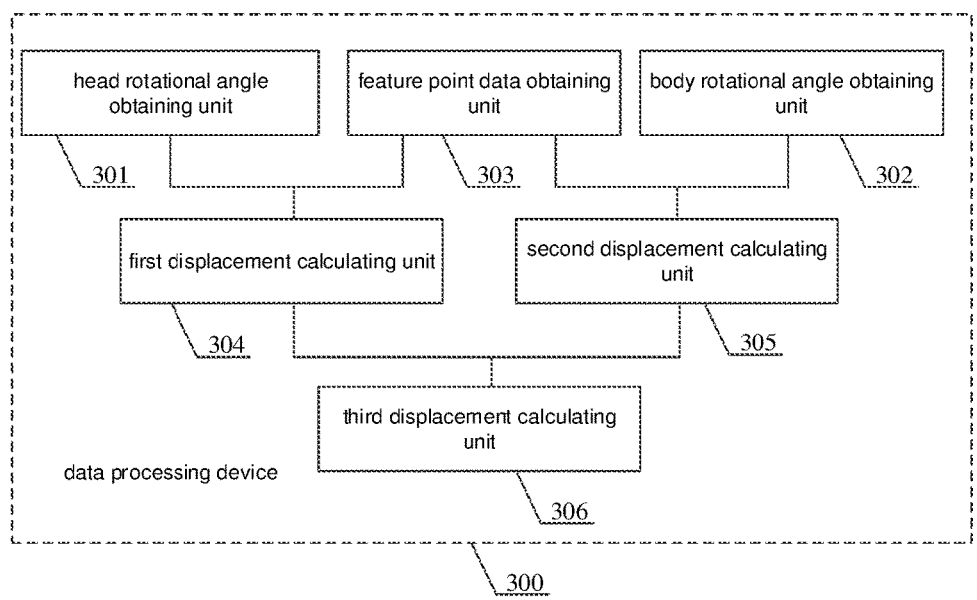
FIG. 4 is a structural block diagram of a data processing device provided by an embodiment of the present invention.

As shown in FIG. 4, a data processing device provided by an embodiment of the present invention is shown, which is applicable to the human body posture data acquisition system. The data processing device includes: a feature point data obtaining unit 303, a head rotational angle obtaining unit 301, a body rotational angle obtaining unit 302, a first displacement calculating unit 304 and a second displacement calculating unit 305.

The feature point data obtaining unit 303 is configured to obtain feature data between pre-calibrated human body feature points. The pre-calibrated human body feature points include a human head center point 401, a head rotation center point 402 and a body rotation center point 403. The feature data includes a length of a first line segment between the head center point 401 and the head rotation center point 402, and a length of a second line segment between the head rotation center point 402 and the body rotation center point 403.

The head rotational angle obtaining unit 301 is configured to obtain a first rotational angle of the first line segment between the head center point 401 and the head rotation center point 402 relative to a vertical direction.

The body rotational angle obtaining unit 302 is configured to obtain a second rotational angle of the second line segment between the head rotation center point 402 and the body rotation center point 403 relative to the vertical direction, the first rotational angle and the second rotational angle being located on a same plane.

The first displacement calculating unit 304 is configured to multiply the length of the first line segment by a sinusoidal function value of the first rotational angle, to obtain a first horizontal displacement of the head center point relative to the head rotation center point.

The second displacement calculating unit 305 is configured to multiply the length of the second line segment by a sinusoidal function value of the second rotational angle, to obtain a second horizontal displacement of the head rotation center point relative to the body rotation center point.

Of course, in practice, in order to further calculate a third horizontal displacement of the head center point relative to the body rotation center point, the data processing device preferably further includes a third displacement calculating unit 306 which is configured to add the first horizontal displacement and the second horizontal displacement together to obtain the third horizontal displacement of the head center point relative to the body rotation center point.

Figure 5:
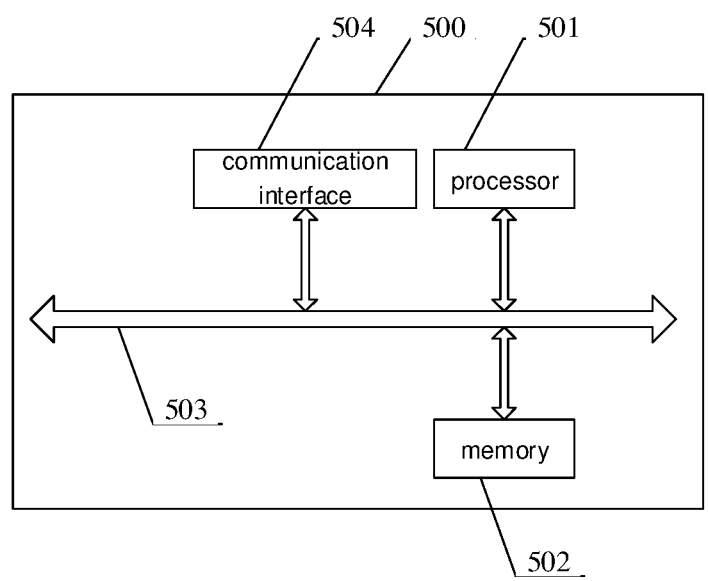
FIG. 5 is a structural block diagram of another data processing device provided by an embodiment of the present invention.

Referring to FIG. 5, another data processing device 500, as further provided by an embodiment of the present invention, includes: a processor 501, a memory 502, a bus 503 and a communication interface 504. The processor 501, the communication interface 504 and the memory 502 are connected through the bus 503. The processor 501 is configured to executing an executable module, such as a computer program, stored in the memory 502.

The memory 502 may include a high-speed random access memory (RAM), and may also include a non-volatile memory, e.g., at least one magnetic disk memory. Communication connection between a network element of this system and at least one other network element may be achieved through at least one communication interface 504 (which may be in a wired or wireless manner), in which the internet, a wide area network, a local network, a metropolitan area network and the like may be used.

The bus 503 may be an ISA bus, a PCI bus or an EISA bus, etc. The bus may include an address bus, a data bus, a control bus, etc. For denotation convenience, it is indicated only with one two-way arrow in FIG. 5, but it does not mean that there is only one bus or only one type of buses.

The memory 502 is configured to store a program, and the processor 501 executes the program after receiving an execution instruction. The method executed by the device defined in the flow process as disclosed in any of the preceding embodiments of the present invention may be applied to the processor 501 or implemented by the processor 501.

The processor 501 may be an integrated circuit chip and has capability of signal processing. In the implementation process, the individual steps of the method described above may be implemented by an integrated logic circuit in the form of hardware or instructions in the form of software in the processor 501. The processor 501 may be a general purpose processor, including a central processing unit (referred to as CPU for short), a network processor (referred to as NP for short) etc.; and may also be a digital signal processor (DSP), an application specific integrated circuit (ASIC), a field programmable gate array (FPGA) or other programmable logic devices, a discrete gate or transistor logic device, and a discrete hardware component. It may implement or execute the individual methods, steps and logic block diagrams disclosed in the embodiments of the present invention. The general purpose processor may be a microprocessor, or the processor may also be any conventional processor, etc. The steps of the method disclosed in connection with the embodiments of the invention may be directly executed and implemented by a hardware module in a decoding processor, or by a combination of hardware and software modules in a decoding processor. The software module may be located in a well-developed storage medium in the art, such as a random access memory, a flash memory, a read only memory, a programmable read only memory or electrically erasable programmable memory, and a register. The storage medium is located in the memory 502, and the processor 501 reads information from the memory 502 and carries out the steps of the method described above in conjunction with the hardware of the processor.

It should be noted that, for the device provided by the embodiments of the present invention, the implementation principle and the resulting technical effects thereof are the same as those of the preceding embodiments of the method. And for the sake of brevity, as to the contents not mentioned in the part of the embodiments of the device, reference may be made to the corresponding contents in the preceding embodiments of the method.

It should be noted that, in the several embodiments provided in the present application, it should be understood that the disclosed system, device and method may be implemented in other ways. The embodiments of the device described above are merely exemplary, for example, the partition of the units is merely performed according to logical functions, and other partition methods can also be adopted in actual implementation.

It should be noted that the units described as separate components may be or may not be physically separated, and the component displayed as an unit may be or may not be a physical unit, that is, it may be located in one place or may also be distributed onto multiple network units. Some or all of the units can be selected according to actual requirements, to achieve the objects of the solutions of the embodiments. In addition, the individual functional units in each embodiment of the present invention may be integrated into one processing unit, or each physically exists separately, or two or more units may be integrated into one unit.

The foregoing is only preferred embodiments of the present invention, which are not intended to limit the present invention. For a person skilled in the art, the present invention may have various changes and variations. Any modifications, equivalent substitutions, improvements etc., made within the spirit and principle of the present invention, shall all be covered by the scope of protection of the present invention.

The invention claimed is:

1. A human body posture data acquisition method, applicable to a human body posture data acquisition system, wherein the human body posture data acquisition system comprises a data processing device, and the human body posture data acquisition method comprises:

the data processing device obtaining feature data between pre-calibrated human body feature points, wherein the pre-calibrated human body feature points comprise a human head center point, a head rotation center point and a body rotation center point, and the feature data comprises a length of a first line segment between the head center point and the head rotation center point, and a length of a second line segment between the head rotation center point and the body rotation center point;

obtaining rotational angles of the human body feature points, wherein the rotational angles comprise a first rotational angle of the first line segment relative to a vertical direction with the first line segment between the head center point and the head rotation center point, and a second rotational angle of the second line segment relative to the vertical direction with the second line segment between the head rotation center point and the body rotation center point, the first rotational angle and the second rotational angle being located on a same plane; and obtaining human body posture data according to the rotational angles of the human body feature points and the feature data between the human body feature points, wherein the human body posture data comprises the rotational angles of the human body feature points, a first horizontal displacement of the head center point relative to the head rotation center point, and a second horizontal displacement of the head rotation center point relative to the body rotation center point, the first horizontal displacement being obtained by multiplying the length of the first line segment by a sinusoidal function value of the first rotational angle, and the second horizontal displacement being obtained by multiplying the length of the second line segment by a sinusoidal function value of the second rotational angle.

2. The human body posture data acquisition method according to claim 1, wherein the human body posture data further comprises: a third horizontal displacement of the head center point relative to the body rotation center point, the third horizontal displacement being obtained by adding the first horizontal displacement and the second horizontal displacement together.

3. The human body posture data acquisition method according to claim 1, wherein the human body posture data acquisition system comprises a first three-axis gyroscope, a first three-axis accelerometer and a first three-axis magnetometer, and the step of obtaining the rotational angle of the pre-calibrated human body feature points, which comprises the first rotational angle of the first line segment between the head center point and the head rotation center point relative to the vertical direction, comprises:

the data processing device receiving the first rotational angle of the first line segment between the head center point and the head rotation center point relative to the vertical direction that is collected by the first three-axis gyroscope, a vertical directing reference obtained by the first three-axis accelerometer and a horizontal directing reference obtained by the first three-axis magnetometer.

4. The human body posture data acquisition method according to claim 3, wherein the human body posture data acquisition system comprises a second three-axis gyroscope, a second three-axis accelerometer and a second three-axis magnetometer, and the step of obtaining the rotational angle of the pre-calibrated human body feature points, which comprises the second rotational angle of the second line segment between the head rotation center point and the body rotation center point relative to the vertical direction, comprises:

the data processing device receiving the second rotational angle of the second line segment between the head rotation center point and the body rotation center point relative to the vertical direction that is collected by the second three-axis gyroscope, a vertical directing reference obtained by the second three-axis accelerometer and a horizontal directing reference obtained by the second three-axis magnetometer.

5. A data processing device, applicable to a human body posture data acquisition system, wherein the data processing device comprises:

a feature point data obtaining unit, configured to cause the data processing device to obtain feature data between pre-calibrated human body feature points, wherein the pre-calibrated human body feature points comprise a human head center point, a head rotation center point and a body rotation center point, and the feature data comprises a length of a first line segment between the head center point and the head rotation center point, and a length of a second line segment between the head rotation center point and the body rotation center point;

a head rotational angle obtaining unit, configured to obtain a first rotational angle of the first line segment between the head center point and the head rotation center point relative to a vertical direction;

a body rotational angle obtaining unit, configured to obtain a second rotational angle of the second line segment between the head rotation center point and the body rotation center point relative to the vertical direction, the first rotational angle and the second rotational angle being located on a same plane;

a first displacement calculating unit, configured to multiply the length of the first line segment by a sinusoidal function value of the first rotational angle, to obtain a first horizontal displacement of the head center point relative to the head rotation center point; and a second displacement calculating unit, configured to multiply the length of the second line segment by a sinusoidal function value of the second rotational angle, to obtain a second horizontal displacement of the head rotation center point relative to the body rotation center point.

6. The data processing device according to claim 5, wherein the data processing device further comprises:

a third displacement calculating unit, configured to add the first horizontal displacement and the second horizontal displacement together, to obtain a third horizontal displacement of the head center point relative to the body rotation center point.

7. A human body posture data acquisition system, comprising a data processing device configured to obtain feature data between pre-calibrated human body feature points, wherein the pre-calibrated human body feature points comprise a human head center point, a head rotation center point and a body rotation center point, and the acquisition system further comprises a head wearing device and a body wearing device;

the head wearing device is configured to be arranged on a human head, and collect a first rotational angle of a first line segment between the head center point and the head rotation center point relative to a vertical direction;

the body wearing device is configured to be arranged on a human chest, and collect a second rotational angle of a second line segment between the head rotation center point and the body rotation center point relative to the vertical direction;

the data processing device is further configured to obtain the first rotational angle of the first line segment between the head center point and the head rotation center point relative to the vertical direction, and the second rotational angle of the second line segment between the head rotation center point and the body rotation center point relative to the vertical direction;

the feature data comprises a length of the first line segment between the head center point and the head rotation center point, and a length of the second line segment between the head rotation center point and the body rotation center point;

the data processing device obtains human body posture data according to the length of the first line segment, the length of the second line segment, the first rotational angle and the second rotational angle, wherein the human body posture data comprises the first and second rotational angles of the human body feature points, a first horizontal displacement of the head center point relative to the head rotation center point, and a second horizontal displacement of the head rotation center point relative to the body rotation center point, the first horizontal displacement being obtained by multiplying the length of the first line segment by a sinusoidal function value of the first rotational angle, and the second horizontal displacement being obtained by multiplying the length of the second line segment by a sinusoidal function value of the second rotational angle.

8. The human body posture data acquisition system according to claim 7, wherein the head wearing device comprises a head rotation data collecting unit, a first wireless data communication unit and a microprocessor, and the head rotation data collecting unit and the first wireless data communication unit each are electrically connected with the microprocessor;

the head rotation data collecting unit comprises: a first three-axis accelerometer configured to obtain a vertical directing reference; a first three-axis gyroscope configured to collect the first rotational angle of the first line segment between the head center point and the head rotation center point relative to the vertical direction; and a first three-axis magnetometer configured to obtain a horizontal directing reference, wherein the first three-axis accelerometer, the first three-axis gyroscope and the first three-axis magnetometer each are electrically connected with the microprocessor.

9. The human body posture data acquisition system according to claim 7, wherein the body wearing device comprises a body rotation data collecting unit and a second wireless data communication unit, and the body rotation data collecting unit is electrically connected with the second wireless data communication unit;

the body rotation data collecting unit comprises: a second three-axis accelerometer configured to obtain a vertical directing reference; a second three-axis gyroscope configured to collect the second rotational angle of the second line segment between the head rotation center point and the body rotation center point relative to the vertical direction; and a second three-axis magnetometer configured to obtain a horizontal directing reference, wherein the second three-axis accelerometer, the second three-axis gyroscope and the second three-axis magnetometer each are electrically connected with the second wireless data communication unit.

10. The human body posture data acquisition system according to claim 7, wherein the head rotation data collecting unit further comprises a temperature collecting unit configured to collect an internal temperature of the head wearing device worn on a human body.

\* \* \* \* \*